United States Patent [19]

Whittam

[11] 4,016,246

[45] Apr. 5, 1977

[54] MANUFACTURE OF SYNTHETIC ZEOLITES

[75] Inventor: Thomas Vincent Whittam, Yarm-on-Tees, England

[73] Assignee: Laporte Industries Limited, London, England

[22] Filed: Aug. 30, 1972

[21] Appl. No.: 284,860

Related U.S. Application Data

[63] Continuation-in-part of Ser. No. 889,339, Dec. 30, 1969, abandoned, which is a continuation-in-part of Ser. No. 536,310, March 22, 1966, abandoned.

[30] Foreign Application Priority Data

Apr. 9, 1965  United Kingdom ............. 15104/65
Nov. 10, 1965  United Kingdom ............. 47616/65

[52] U.S. Cl. .............................................. 423/329
[51] Int. Cl.$^2$ ....................................... C01B 33/28
[58] Field of Search .................. 423/328, 329, 330; 252/455 Z

[56] References Cited

UNITED STATES PATENTS

| | | | |
|---|---|---|---|
| 2,904,607 | 9/1959 | Mattox et al. ................. | 252/455 Z |
| 2,971,903 | 2/1961 | Kimberlin et al. ............. | 252/455 Z |
| 3,055,841 | 9/1962 | Gladrow et al. ............... | 252/455 Z |
| 3,058,805 | 10/1962 | Weber ............................... | 423/328 |
| 3,130,007 | 4/1964 | Breck ............................... | 423/328 |
| 3,310,373 | 3/1967 | Johnson ............................. | 423/329 |

*Primary Examiner*—Edward J. Meros
*Attorney, Agent, or Firm*—Beveridge, DeGrandi, Kline, Lunsford

[57] ABSTRACT

The invention provides a method of preparing zeolite Y of high degree of purity and having a silica to alumina molar ratio of from greater than 3 up to about 6.2 which comprises preparing an aluminosilicate reaction mixture having oxide molar ratios of $SiO_2/Al_2O_3$, $Na_2O/SiO_2$ and $H_2O/Na_2O$ lying within specified ranges, at least part of the siliceous component of the reaction mixture being a particular hydrated sodium metasilicate and then heating the reaction mixture until zeolite Y crystallizes from the reaction mixture, the particular hydrated sodium metasilicate being defined by its ability to form substantially pure zeolite X under specified conditions.

8 Claims, No Drawings

MANUFACTURE OF SYNTHETIC ZEOLITES

This application is a continuation-in-part of application Ser. No. 889,339 filed Dec. 30, 1969, now abandoned, which in turn is a continuation-in-part of application Ser. No. 536,310 filed March 22, 1966 and now abandoned.

This invention is concerned with improvements in or relating to the preparation of crystalline synthetic zeolites and in particular to the preparation of the zeolite known as zeolite Y.

Zeolite Y is a well-known crystalline zeolite (see for example J. A. Rabo et al, 1960 Actes due Deuxieme Int. de Catalyse Paris 2, 2055). It is isostructural with the mineral faujasite and also zeolite X. Its chemical composition as given in U.S. Patent Specification No. 3,130,007 (Breck) is $0.9 \pm 0.2$ $Na_2O \cdot Al_2O_3 \cdot w\, SiO_2 \cdot x\, H_2O$ where 'w' is a value greater than 3 up to about 6 and x may be a value up to about 9.

The full range of X-ray powder diffraction data for zeolite Y given in U.S. Patent Specification No. 3,130,007 is reproduced in Table 1 below. In that table 'd' is the interplanar spacing in Angstrom units and the relative intensities 'I' of the lines of X-ray powder diffraction pattern are expressed as VS, very strong; S, strong; M, medium; W, weak; and VW, very weak.

Table 1

| | X-ray data for Zeolite Y from U.S. Pat. No. 3,130,007 | | | | |
|---|---|---|---|---|---|
| d | 14.15–14.4 | 8.67–8.80 | 7.39–7.50 | 5.62–5.71 | 4.72–4.79 |
| I | VS | M | M | S | M |
| d | 4.33–4.46 | 4.16–4.29 | 4.09–4.13 | 3.88–3.93 | 3.74–3.79 |
| I | M | W | W | W | S |
| d | 3.62–3.66 | 3.43–3.48 | 3.28–3.33 | 3.00–3.04 | 2.89–2.93 |
| I | M | VV | S | M | M |
| d | 2.83–2.87 | 2.74–2.78 | 2.69–2.73 | 2.61–2.65 | 2.50–2.54 |
| I | S | M | W | M | VW |
| d | 2.45–2.49 | 2.40–2.44 | 2.36–2.39 | 2.25–2.29 | 2.21–2.24 |
| I | VW | VV | M | VW | VW |
| d | 2.17–2.20 | 2.14–2.18 | 2.08–2.11 | 2.04–2.07 | 2.00–2.03 |
| I | W | V | W | VW | VW |
| d | 1.89–1.92 | 1.83–1.86 | 1.79–1.82 | 1.76–1.78 | 1.73–1.76 |
| I | VW | V | VW | VW | W |
| d | 1.69–1.71 | | | | |
| I | W | | | | |

In prior Application Ser. No. 868,217 by T. V. Whittam filed on Oct. 21st 1969, now abandoned as a continuation-in-part of Application Ser. No. 456,815 filed on May 18th 1965, now abandoned, there is described a method for the preparation of, inter alia, zeolite Y which comprises preparing an aqueous sodium aluminosilicate reaction mixture having a composition expressed in terms of the oxide molar ratios $Na_2O/SiO_2$, $SiO_2/Al_2O_3$ and $H_2O/Na_2O$ lying within specified ranges in which at least part of the siliceous component of the reaction mixture is a particular form of sodium metasilicate pentahydrate. Employing the method disclosed in that Application the zeolite Y products have a maximum $SiO_2/Al_2O_3$ molar ratio of 4.

In U.S. Patent Specification No. 3,130,007 there is described a method of preparing zeolite Y which comprises preparing an aqueous sodium aluminosilicate reaction mixture having a composition expressed in terms of the oxide molar ratios $Na_2O/SiO_2$, $SiO_2/Al_2O_3$ and $H_2O/Na_2O$, falling within stated ranges and then treating the prepared reaction mixture in a specified manner to give a zeolite Y product. The treatment of the reaction mixture when a relatively pure zeolite Y of high silica to alumina molar ratio, particularly a $SiO_2/Al_2O_3$ molar ratio of greater than about 4.5, is required entails a lengthly room-temperature digestion step and the avoidance of agitation during this step and in particular during the subsequent crystallisation step.

It is stated in that Specification that, where the source of the siliceous component of the reaction mixture is sodium silicate (specifically sodium disilicate was employed), silica or silicic acid, the silica to alumina molar ratio of the zeolite Y is from 3 to 3.9 and that for a zeolite Y having a silica to alumina molar ratio of greater than 3.9 the source of the siliceous component should be aqueous colloidal silica sols or reactive amorphous solid silicas. For obtaining a relatively pure zeolite Y of $SiO_2/Al_2O_3$ molar ratio of up to about 6 the preferred oxide molar ratios of the zeolite reaction mixture, using aqueous colloidal silica sols or reactive amorphous solid silicas, are given as:

| $Na_2O/SiO_2$ | 0.28–0.30 | About 0.4 |
|---|---|---|
| $SiO_2/Al_2O_3$ | 8–10 | 10–27 |
| $H_2O/Na_2O$ | 30–50 | 30–50 | and the particularly preferred ranges as

| $Na_2O/SiO_2$ | 0.30 | 0.4 | 0.42 |
|---|---|---|---|
| $SiO_2/Al_2O_3$ | 8–10 | 10–20 | About 27 |
| $H_2O/Na_2O$ | About 40 | About 40 | About 33 |

To obtain the relatively pure zeolite Y, the zeolite reaction mixture is digested at ambient or room temperature for a period of at least 16 hours and preferably for a period of from 24 to 32 hours and then subjected to a crystallisation period which entails heating the reaction mixture to 90° – 100° C and then maintaining it within this temperature for a period sufficiently long to give the required crystals, this latter period ranging from 24 to 196 hours.

The necessity of the room-temperature digestion step is illustrated in Table V of the Specification for U.S. Pat. No. 3,130,007 with reference to the preparation of a zeolite Y of $SiO_2/Al_2O_3$ molar ratio of 5 employing an aluminosilicate reaction mixture having oxide molar ratios of $Na_2O/SiO_2 = 0.4$, $SiO_2/Al_2O_3 = 20$ and $H_2O/Na_2O = 40$, these oxide molar ratios coming within the quoted particularly preferred ranges. It is shown in that table that in the absence of a room-temperature digestion step a product containing about 60% only of a zeolite Y of $SiO_2/Al_2O_3$ molar ratio of less than 5 was obtained after crystallisation at 100° C for 3 days. When, however, the reaction mixture was digested at room-temperature for 1 day and then maintained at 100° C for a period of somewhat more than 2 days a substantially pure zeolite Y (92%) of silica to alumina ratio of 5.0 was obtained. Experiments presented later in the present Specification accord with those given in Table V of U.S. Pat. No. 3,130,007 and further show that agitation in the crystallisation step has a highly deleterious effect on the course of the reaction giving rise to products other than zeolite Y. Thus, to avoid the formation of other products mechanical agitation should be excluded and agitation resulting from temperature gradients within the reaction mixture should be kept to a minimum.

In the Specification for U.S. Pat. No. 3,130,007 it is proposed to prepare zeolite Y on a laboratory scale without using the room-temperature digestion step, but only impure products are obtained having a $SiO_2/Al_2O_3$ molar ratios of less than 5 and agitation must be avoided. If attempts are made to scale up quantities to a semi-commercial scale, thermal agitation problems are encountered and even if zeolite Y is obtained, which is not always the case, large amounts of impurities are present in the product. Good results on a semi-commercial scale can only be achieved with the method of the Specification for U.S. Pat. No. 3,130,007 where agitation is kept to minimum and a room-temperature digestion period employed. This is shown in an example of that Specification where to obtain a zeolite Y of $SiO_2/Al_2O_3 = 5.1$ a quiescent room-temperature digestion period of 28 hours was required, followed by extremely rapid heat-up with minimum agitation and then reaction at 96° C for 48 hours without agitation.

The thermal stability and resistance to acid attack of a zeolite is to a large degree dependent upon the silica to alumina molar ratio of the zeolite, the higher the ratio the more stable is the zeolite. This is illustrated by the series of zeolites, zeolite A, zeolite X and zeolite Y in which within the series the $SiO_2/Al_2O_3$ molar ratio increases from a value of less than 2, to a value from 2 to about 3 and then to a value of from greater than 3 up to 6. In preparing a particular zeolite any one or more of a number of factors may well be critical to success such as, for example, the composition of the reaction mixture, its mode of preparation, the source of the components of the reaction mixture and the manner of effecting crystallisation of the product from the reaction mixture. In general it may be said that zeolites of low $SiO_2/Al_2O_3$ molar ratio are more easily prepared than those of high $SiO_2/Al_2O_3$ molar ratio and that the higher the molar ratio, the more critical are the conditions required for preparing the zeolite.

With regard to the source of the components of the reaction mixture, prior art methods for preparing crystalline zeolites have commonly used sodium aluminate to provide the alumina component of the reaction mixture and a sodium silicate in the form of water glass ($Na_2O$. $n$ $SiO_2$ where n can have values of from 2–4) to provide the siliceous component of the reaction mixture. Where additional $Na_2O$ component is required to give the desired oxide molar ratios of the reaction mixture this has commonly been provided by sodium hydroxide.

For the preparation of zeolites A and X it has also been proposed to employ sodium metasilicate as the source of the siliceous component of the reaction mixture. Thus U.S. Pat. No. 3,055,841 (Gladrow), which is concerned with the preparation of zeolite A and subsequently treating the prepared zeolite with a sodium silicate to increase its attrition resistance discloses mixing a sodium metasilicate solution and a sodium aluminate solution in specified amounts and then subsequently treating the prepared reaction mixture to give zeolite A. The relative proportions of the solutions employed are preferably such as to give a reaction mixture having a $SiO_2/Al_2O_3$ molar ratio of 2. Since sodium metasilicate is the sole source of silica, the $Na_2O/SiO_2$ molar ratio of the reaction mixture must necessarily be greater than 1; specifically a molar ratio of 1.5 was employed. Gladrow states that it is essential that the source of the siliceous component should be one having a $Na_2O/SiO_2$ ratio of greater than 0.8 preferably 1. Sources of the siliceous component having a lower $Na_2O/SiO_2$ ratio are stated to be ineffective since extended heat-soaking periods are required. In the case of zeolite A, high $Na_2O/SiO_2$ ratios in a zeolite reaction mixture having other appropriate molar ratios accelerate formation of zeolite A.

Reference is also made to the use of sodium metasilicate in the preparation of zeolite X in the Specifications for U.S. Pat. Nos. 2,904,607 (Mattox et al) 2,950,332 (Mattox) and 2,971,903 (Kimberlin et al) all to the same Assignor as the previously mentioned U.S. Pat. No. 3,055,841 (Gladrow). The Specifications are primarily concerned with the use of zeolite X as a catalyst and only Kimberlin gives full details for the preparation of zeolite X, the general disclosure in the Specification concerning sodium metasilicates according substantially with the disclosure in U.S. Pat. No. 2,950,332 (Mattox) and 2,904,607 (Mattox et al). In U.S. Pat. No. 2,971,903 (Kimberlin et al) the $Na_2O/SiO_2$ ratio of the reaction mixture must necessarily be greater than 1, specifically 1.5 was employed and the preferred $SiO_2/Al_2O_3$ molar ratio is given as 2.5 – 4.1 (specifically in Experiment 4 a $SiO_2/Al_2O_3$ ratio of 4 was used). To obtain zeolite X the reaction mixture was maintained at 180° – 210° F for a period of 240 hours. As is shown later in the present Specification the 'active' sodium metasilicate employed in preparing zeolite Y in accordance with the present invention is distinguished from the conventional sodium metasilicate employed by Kimberlin et al.

It is an object of the present invention to provide a novel process for preparing zeolite Y.

It is a further object of the present invention to provide a novel process for preparing zeolite Y which avoids the need to employ a room-temperature digestion step and in which the use of agitation is optional. A still further object is to provide a process of preparing zeolite Y which is particularly applicable to the preparation of high purity zeolite Y of high silica to alumina molar ratio. Other and further objects and advantages of the invention will become more clear hereinafter.

It has now been found that the above objects may be achieved by employing in a specified manner an 'active' hydrated sodium metasilicate as herein defined, to provide at least part of the siliceous component of the zeolite reaction mixture.

The term 'active' as used in the present Specification in relation to hydrated sodium metasilicate is applied to those hydrated sodium metasilicates which are capable of yielding substantially pure zeolite X within a three hour reaction period in a test procedure employing the following conditions and procedure:-

The composition of the reaction mixture, expressed in terms of the oxide molar ratios is:

| | | |
|---|---|---|
| $SiO_2/Al_2O_3$ | = | 3.85 |
| $Na_2O/SiO_2$ | = | 1.34 |
| $H_2O/Na_2O$ | = | 47.00 |

The source of the siliceous component of the reaction mixture is the hydrated sodium metasilicate under test and the source of the alumina component is conveniently sodium aluminate. The $Na_2O$ component is provided by the sodium cation of the metasilicate and the aluminate and where additional sodium cation is needed to give the required amount of $Na_2O$ this is conveniently provided by sodium hydroxide. Whether sodium hydroxide is needed will depend upon the $Na_2O/Al_2O_3$ molar ratio of the sodium aluminate employed. The prepared reaction mixture is then raised to a temperature of 90° – 100° C and, under vigorous stirring, maintained at that temperature under reflux for a period of three hours. The product is separated from the reaction mixture and the weight percentage of zeolite X in the product determined by conventional X-ray powder diffraction techniques. A hydrated sodium metasilicate which under these conditions gives rise to a product which is substantially pure zeolite X, i.e. a product containing 98% or more zeolite X is termed 'active', a hydrated metasilicate which fails the test is termed 'inactive'. In the test procedure the essential features are the specified oxide molar ratios and the specified period and conditions of heating at 90° – 100° C. In the test procedure specifically used in the present Specification, the hydrated metasilicate under test and any sodium hydroxide required were dissolved in about one half of the total amount of water required. To this solution was slowly added under stirring, the sodium aluminate and the remainder of the required amount of water. The reaction mixture prepared in this manner was then vigorously stirred for a further 10 minutes to ensure that the mixture was homogeneous and then raised to the temperature of 90° – 100° C. After the specified 3 hour reaction period the product was filtered, washed, dried at 80° – 140° C and then examined by X-ray powder diffraction techniques. A suitable scale for carrying out the above test is that giving 50 – 500 g of reaction mixture.

With the exception of their behaviour in zeolite reactions no difference has been found between active and inactive hydrated sodium metasilicate. Thus no difference in chemical composition, nor any difference on physical examination by infra-red spectroscopy, electron microscopy and thermogravimetric analysis has been found. Even X-ray powder diffraction data have failed to distinguish between an active and inactive hydrated sodium metasilicate. As was stated in prior Application Ser. No. 868,217 by T. V. Whittam filed on Oct. 21, 1969, now abandoned as a continuation-in-part of Application Ser. No. 456,815 filed on May 18, 1965, now abandoned, it has therefore been necessary in the absence of any other difference to rely on the activity test based on the difference in behaviour in zeolite reactions in order to distinguish between the active and inactive forms of a particular hydrated metasilicate.

In prior Application Ser. No. 868,217 by T. V. Whittam filed on Oct. 21, 1969, now abandoned, as a continuation-in-part of Application Ser. No. 456,815 filed on May 18, 1965, now abandoned, active sodium metasilicate pentahydrate was described and in that application was obtained by screening commercially available sources of sodium metasilicate pentahydrate, and selecting those few sources which passed the activity test.

It has now been found that other hydrated sodium metasilicates can exist in the 'active' form and a method has been denised for preparing active hydrated metasilicates which is described hereinafter. It has further been found that an active hydrated sodium metasilicate may possess various degrees of reactiveness towards zeolite formation reactions. This is now described as the 'activity rating'.

Activity rating is a measure of the degree of activity of a hydrated sodium metasilicate and is an arbitrary figure based on the weight percentage of zeolite X present in the solid products obtained in a series of specified tests.

The first of the series of activity rating tests is the 'activity' test described in the present Specification for determining whether a hydrated sodium metasilicate is 'active'. As stated in that test the metasilicate under test provides the whole of the siliceous component of the reaction mixture, and the reaction mixture having a composition expressed in terms of oxide molar ratios of $SiO_2/Al_2O_3 = 3.85$, $Na_2O/SiO_2 = 1.34$ and $H_2O/Na_2O = 47.00$ is maintained under reflux and with vigorous stirring at 90° – 100° C for a period of 3 hours.

The second and subsequent activity rating tests of the series are carried out using the same conditions and procedure as for the first test, except that the hydrated sodium metasilicate under test provides a progressively smaller proportion of the siliceous component of the reaction mixture, the remainder of the siliceous component being provided by an inactive silicate of zero activity rating in the form of a sodium disilicate. A commercial sodium disilicate of approximate composition $Na_2O. 2.1 SiO_2. 14.1 H_2O$ has been employed. The hydrated sodium metasilicate hydrate under test provides on a silica molar basis, 10 percent of the siliceous component of the reaction mixture in the second test, 1 percent in the third test 0.1 percent in the fourth test, and so forth.

In carrying out the activity rating tests, the appropriate amount of the sodium metasilicate under test together with the appropriate amount of inactive sodium disilicate diluent is dissolved in about one half of the required amount of water containing the required amount of sodium hydroxide and then the procedure hereinbefore specified for the 'activity' test is followed. The solid product is separated from the reaction mixture; washed and dried as specified and then the weight percentage of zeolite X in the product is determined by X-ray powder diffraction techniques.

The weight percentage of zeolite X in the product may be found by comparison of the X-ray powder diffraction data for that product with X-ray powder diffraction data for standards containing known amounts of zeolite X, the balance in each standard being provided by zeolite B and/or zeolite C.

In practice the sodium metasilicate under test is subjected to each of the activity rating tests in succession up to and including the test in which the test material fails to give substantially pure zeolite X. A suitable scale for carrying out the activity rating tests is that giving 50–500 grams of reaction mixture.

A hydrated sodium metasilicate which in the first of the series gives rise to a product containing no significant quantity of zeolite X, that is less than about 1% zeolite X in the product, is assigned an activity rating of zero. The product obtained with such a metasilicate is a mixture of zeolite B and zeolite C.

A hydrated sodium metasilicate which in the first test gives rise to substantially pure zeolite X, that is a product containing 98% or more of zeolite X, and in the second test to a product containing up to 70% zeolite X (the remainder of the product being zeolite B and/or zeolite C) is assigned an activity rating of 10.

A hydrated sodium metasilicate which gives rise to substantially pure zeolite X in the second test and to a product containing up to 60% zeolite X in the third test is assigned an activity rating of 100.

A hydrated sodium metasilicate hydrate which gives rise to substantially pure zeolite X in the third test, and to a product containing up to 50% zeolite X in the fourth test is assigned an activity rating of 1000 units. Activity ratings of higher powers of ten can similarly be assigned to those hydrated sodium metasilicates which at correspondingly higher dilutions give rise to substantially pure zeolite X in one test and to a product containing up to 50% zeolite X in the succeeding test.

For activity ratings intermediate the powers of ten, the relationship between the activity rating and the percentage of zeolite X in the product is taken to be a linear relationship. Thus for a hydrated sodium metasilicate which in the first test gives rise to substantially pure zeolite X and in the second test to a product containing from 70% zeolite X up to less than 98% zeolite X (98% corresponding to substantially pure zeolite X) and which therefore has an activity rating of between 10 and 100 units, the actual activity rating is calculated using the relationship:

Activity rating = 10 +90/30 (% of zeolite X in the product − 70%).

Similarly the activity rating for a hydrated sodium metasilicate giving rise to substantially pure zeolite in the second test and to a product containing from greater than 60% zeolite X up to less than 98% zeolite X in the third test and therefore having an activity rating between 100 and 1000 units, is calculated using the relationship:

Activity rating = 100 + 900/40 (% of zeolite X in the product − 60%)

Activity ratings intermediate the higher powers of ten are calculated in a similar manner.

As herein defined an 'active' hydrated sodium metasilicate is one giving rise to substantially pure zeolite X in the first activity rating test and its activity rating is therefore at least 10 units. For most purposes an activity rating of 10 units is the lower useful limit of activity rating. An inactive material which in the first test gives rise to a product containing less than about 1% zeolite X is assigned an activity rating of zero. For a material which would give rise in the first test to a product containing from about 1% up to 98% zeolite X, its activity rating would be calculated by dividing the percentage of zeolite X by 10.

The present invention provides a method of preparing zeolite Y of a high degree of purity and having a silica to alumina molar ratio of from greater than 3 up to about 6.2 which comprises preparing an aqueous aluminosilicate mixture containing a siliceous component, an alumina component and a $Na_2O$ component and having a composition expressed in terms of oxide molar ratios lying within the following ranges:

|     | $Na_2O/SiO_2$ | $SiO_2/Al_2O_3$ | $H_2O/Na_2O$ |
|-----|---------------|-----------------|--------------|
| (1) | 0.28 − <0.30  | 8 − 10          | 20 − 70      |
| (2) | 0.30 − <0.31  | 8 − 12          | 20 − 70      |
| (3) | 0.31 − <0.32  | 8 − 14          | 20 − 70      |
| (4) | 0.32 − <0.34  | 8 − 16          | 12 − 90      |
| (5) | 0.34 − <0.40  | 7 − 40          | 12 − 120     |
| (6) | 0.4 − <0.7    | 5 − 50          | 12 − 120     |
| (7) | 0.7 − 1.0     | 31 − 50         | 12 − 120     | at least part of the siliceous component being a hydrated sodium metasilicate capable when providing the whole of the siliceous component of a test zeolite reaction mixture having oxide molar ratios of $Na_2O/SiO_2$ = 1.34, $SiO_2/Al_2O_3$ = 3.85 and $H_2O/Na_2O$ = 47.00 of yielding substantially pure zeolite X on heating said test zeolite reaction mixture under reflux and with vigorous stirring at 90° − 100° C for a period of 3 hours, the ratio of the said hydrated sodium metasilicate present in the aluminosilicate reaction mixture to any other siliceous material present expressed on a molar silica basis lying within the range 1.0:0 to 1.0:6,000, and heating the prepared aluminosilicate reaction mixture at a temperature in the range of from 20° to 120° C until a crystalline product is obtained.

Within the oxide molar ratio ranges quoted, formation of a zeolite Y of high silica to alumina molar ratio is, in general, favoured by use of a low $Na_2O/SiO_2$ ratio and a high $SiO_2/Al_2O_3$ ratio. With decresing $Na_2O/SiO_2$ ratio the ranges of $SiO_2/Al_2O_3$ and $Na_2O/SiO_2$ oxide molar ratios which can be employed to prepare zeolite Y become progressively narrower and more critical.

For the $H_2O/Na_2O$ molar ratios those preferred in ranges 1 − 7 are as follows:

35–60, 35–60, 30–70, 20–90, 20–90 and 20–90 respectively and in the case of the $SiO_2/Al_2O_3$ molar ratios the preferred ratios in the ranges 5 and 6 are 8–30 and 10–30 respectively.

The alumina component of the aluminosilicate reaction mixture may suitably be provided by a soluble aluminum compound such as sodium aluminate or a water soluble aluminum salt, preferably aluminum sulphate. Sodium aluminate is, however, the preferred reagent since it limits the tendency to introduce foreign ions into the zeolite lattice. If aluminum sulphate or other water soluble salt is used then the oxide molar ratios $Na_2O/SiO_2$ quoted above must not include $Na_2O$ which will be used up in yielding a neutral sulphate with the anion released during reaction. For example in Experiment 29 of Table 5 below the total $Na_2O/SiO_2$ is 0.55 but the useful reaction is 0.4.

As previously specified the hydrated sodium metasilicate employed in the present invention is one capable of yielding substantially pure zeolite X under stated conditions and is herein termed "active". The active hydrated sodium metasilicate may be a discrete hydrate or a mixture of hydrates or mixtures of hydrates with anhydrous metasilicate or even a metasilicate having a structure corresponding to anhydrous metasilicate but which may contain up to 2 moles of water. The preparation of hydrated sodium metasilicate in the active form is described hereinafter. In general, the molar composition of the active hydrated sodium metasilicate corresponds to $Na_2O . SiO_2$ n $H_2O$ where n is from about 0.05 up to about 10.

The $Na_2O$ component of the reaction mixture is provided by the cation of the active hydrated sodium metasilicate, the cation of any inactive sodium silicate employed and, when used to provide the alumina component of the reaction mixture, the cation of the sodium aluminate. When a further source of $Na_2O$ is required, as for example when the active hydrated metasilicate is used in combination with silica, this is conveniently sodium hydroxide. At the upper end of the $Na_2O/SiO_2$ ranges quoted above i.e. approaching a $Na_2O/SiO_2$ = 1, the active hydrated sodium metasilicate ($Na_2O/SiO_2$ = 1), may be the sole source of the siliceous component of the reaction mixture by employing an aluminum salt as the major or sole source of the alumina component of the reaction mixture.

With the active hydrated sodium metasilicate there may also be used an inactive siliceous material which together constitute the siliceous component of the reaction mixture. This inactive siliceous material may be water glass, silica of colloidal particle size for example colloidal silica or highly dispersed silica, fume silica or amorphous silica.

The relative proportions of active metasilicate and inactive siliceous material which may be employed are dependent upon the activity rating of the metasilicate. The ratio of active metasilicate to inactive siliceous material on a molar silica basis should lie within the range of from 1:0 to 1.0:6,000. In the case of an active metasilicate of activity rating of about 100 units the operative range is 1.0:0 to 1.0:60 with a preferred range of 1.0:0 to 1.0:7 and a most preferred range of 1.0:1.0 to 1.0:7 For activity ratings of substantially greater than 100 units the active hydrated metasilicate may be used at dilutions of greater than 1:60.

In preparing the aluminosilicate reaction mixture it is preferred to add a solution of the alumina component to a stirred solution containing the active hydrated sodium metasilicate and any inactive siliceous material. The order of addition is not, however, considered to be critical. The aluminosilicate reaction mixture should, however, be homogeneous and thorough mixing is therefore essential, particularly with the very thick slurries obtained at the lower ends of the $H_2O/Na_2O$ and $SiO_2/Al_2O_3$ ranges.

The aluminosilicate reaction mixture may also be prepared by adding a solution of sodium aluminate to a well stirred solution of the hydrated active metasilicate, or vice versa, continuing stirring until a homogeneous gel is obtained and then stirring into the gel a silica of colloidal particle size to give a uniform mix. Alternatively, the silica of colloidal particle size may be added to the solution of sodium aluminate to give a homogeneous gel and the solution of the active hydrated metasilicate then stirred into the gel and sitrring continued until a homogeneous mixture is obtained.

The above methods of preparing the aluminosilicate reaction mixture should preferably be carried out at ambient temperatures.

The zeolite Y product is obtained from the prepared aluminosilicate reaction mixture by heating the aluminosilicate reaction mixture to a temperature of from 20° to 120° C, preferably 80°–120° C, and maintaining it at that temperature for a period sufficient to effect crystallisation of the zeolite Y product.

Whereas in known methods for preparing zeolite Y agitation of the reaction mixture adversely affects formation of zeolite Y and for good results it is necessary to exclude mechanical agitation and, particularly for large scale preparations, to take steps to avoid undue thermal agitation, in the process of the present invention agitation does not adversely affect zeolite Y formation and for the best results it is in fact preferred to agitate the reaction mixture during zeolite Y formation, for example by means of stirring. In the present invention, heating of the reaction mixture to the crystallisation temperature may be rapid or slow as desired and good agitation promotes rapid reaction.

The reaction time, that is the period of time necessary for effecting crystallisation of the zeolite Y product from the reaction mixture, is dependent upon the composition of the reaction mixture in terms of oxide molar ratios, the concentration of the active hydrated sodium metasilicate in the reaction mixture, the activity rating of the active hydrated sodium metasilicate and the reaction temperature, that is the temperature at which crystallisation is effected. The reaction time can vary from short periods at 80° – 120° C up to many days at 30° C.

To ensure a good yield of the desired zeolite Y product it is necessary to react the zeolite mixture beyond a certain minimum time. If, however, the reaction is continued too long, the product starts to lose silica, that is the silica to alumina ratio starts to fall, and if the reaction is continued even further then the product may recrystallise to an undesirable zeolitic material. There is an optimum reaction time which is, in part, determined by the ratios and concentrations of the original reaction mixture, by the size of the batch, the time required to mix the ingredients and the rate of heating. The optimum reaction time can readily be determined by experiment.

The active hydrated sodium metasilicate in accordance with the invention may be prepared by carefully hydrating sodium metasilicate under specified conditions.

Thus in one method of preparing an active sodium metasilicate hydrate an aqueous solution is prepared containing sodium metasilicate and water in proportions corresponding to the required hydrate, the solution is supercooled and the required hydrate crystallised from the supercooled solution at a temperature which is maintained during crystallisation within the range of from 15° C up to a temperature of 15° C below the melting point of the required hydrate. A preferred temperature range is 20° C to 30° C. The aqueous sodium metasilicate solution may be prepared from sodium metasilicate itself or from the appropriate amounts of sodium hydroxide and a silica or silicate such that the $Na_2O/SiO_2$ molar ratio in the resulting solution corresponds to that for sodium metasilicate. Suitably, crystallisation may be effected by seeding the sodium metasilicate solution with a solid sodium metasilicate hydrate. In a related method of preparing an active sodium metasilicate hydrate, solid sodium metasilicate is mixed with insufficient water to dissolve it and crystallisation of the desired hydrate is effected from the aqueous phase employing the temperature range previously specified. These crystallisation methods are particularly applicable to the preparation of active sodium metasilicate hydrate having four or more moles of water.

The active hydrated sodium metasilicates may also be prepared by contacting solid sodium metasilicate, preferably anhydrous sodium metasilicate, with water vapour to hydrate the metasilicate, the temperature during hydration being maintained at from 0° to 60° C. This method is particularly applicable to the preparation of active hydrated sodium metasilicate containing less than 4 moles of water per mole of metasilicate.

In the above methods, the quoted temperature ranges are critical for obtaining an active material and, in general, it is necessary to provide means for removing heat evolved during hydration so that the temperature does not rise above the quoted upper limits.

The active hydrated sodium metasilicates specified later in the examples were prepared by the above methods.

The invention will now be illustrated with reference to the following examples. In the tables for the examples the reference numbers used to indicate details of the reactants are as follows:-

1. Molar composition; $1.3 Na_2O.Al_2O_3. 12H_2O$
2. Molar composition; $SiO_2.7.7H_2O$
3. Molar composition; $Na_2O.SiO_2.3.2H_2O$ 4. Molar composition; $Na_2O.4SiO_2.43H_2O$
5. Molar composition; $Na_2O.2SiO_2.14.1H_2O$ The quoted percentages of zeolite Y are estimated in terms of adsorptive capacity related to the theoretical capacity having regard to the $SiO_2/Al_2O_3$ ratio.

EXAMPLE 1 this is a comparative example employing the method of U.S. Pat. No. 3,130,007 for preparing zeolite Y with a reaction mixture having oxide molar ratios coming within the ranges stated therein as being most preferred and using as the siliceous component colloidal silica which is specified as a preferred material. The effect of replacing part of the colloidal silica by conventional 'inactive' hydrated sodium metasilicate in the method of U.S. PaT. No. 3,130,007 is shown and compared with the use in accordance with the present invention of 'active' hydrated sodium metasilicate in combination with colloidal silica.

A series of experiments was carried out and these experiments are shown in Table 2. The colloidal silica and inactive sodium metasilicate pentahydrate employed had activity ratings of zero i.e. gave rise to no significant quantity of zeolite X in the first test of the activity rating tests previously specified. In testing the silica, the appropriate amount of sodium hydroxide was used to give the oxide molar ratios specified in the activity rating test. The activity rating of the active sodium metasilicate pentahydrate was determined as previously described.

'Ageing' in the experiments of Table 2 entailed allowing the prepared reaction mixture to stand quiescently at ambient temperature for the stated period of time. Reaction to effect crystallisation of the product was carried out for the stated period of time and where agitation was employed in the crystallisation step this was effected by stirring the reaction mixture.

Experiments 1 and 3 were a repeat of the experiments specified in Table V of U.S. Pat. No. 3,130,007 and confirm that where a pure zeolite Y of relatively high $SiO_2/Al_2O_3$ molar ratio is required, the reaction mixture must be aged, that is subjected to a quiescent room-temperature digestion step. Experiments 2 and 4 show that no zeolite Y is obtained by the method of U.S. Pat. No. 3,130,007 when the reaction mixture is agitated during crystallisation. In experiments 2 and 4 the product at 12 hours and at 72 hours was a mixture of zeolite B, zeolite C and amorphous material.

Replacement of part of the colloidal silica by conventional inactive hydrated sodium metasilicates in the method of U.S. Pat. No. 3,130,007 has no significant effect on the reaction as is shown in Experiments 5, 6, 7 and 9. When, however, an active hydrated sodium metasilicate is employed in accordance with the present invention, zeolite Y is obtained in the absence of an ageing step and agitation does not adversely affect the reaction. This is shown by Experiments 8 and 10, which further illustrate the relatively short overall reaction time which is required as compared with th prior art process.

EXAMPLE 2

Kimberlin et al in U.S. Pat. No. 2,971,903 disclose in Example 4 the use of a sodium metasilicate pentahydrate in the preparation of zeolite X. This present example demonstrates that the metasilicate pentahydrate employed by Kimberlin et al was inactive.

Two experiments were carried out using the conditions specified in Example 4 of Kimberlin et al, and employing an active or an inactive sodium metasilicate pentahydrate as specified. In the experiments the zeolite reaction mixture was prepared in the following manner. 4350 grams of sodium metasilicate pentahydrate were dissolved in 13 liters of water at room temperature. Using rapid stirring, 2650 gms. of a sodium aluminate solution (20% $Al_2O_3$ and 1.5 $Na_2O$. $Al_2O_3$ molar composition) were added to the silicate solution. An additional 10 liters of water were then added and the reaction mixture thoroughly stirred. For each experiment the prepared reaction mixture was heated to 210° F and maintained at this temperature (with or without agitation as specified). Samples were taken from the zeolite reaction maintained at this temperature after stated periods of time and the product obtained was examined by X-ray powder diffraction analysis.

Experiment A - In this experiment the metasilicate was inactive sodium metasilicate pentahydrate and the zeolite reaction mixture was maintained at 210° F in the absence of any agitation. The products obtained after specified periods of time were as follows:-

| Reaction Time Hours | X-Ray Diffracton Pattern |
|---|---|
| 3 | Amorphous |
| 24 | Amorphous + Zeolite X |
| 48 | Amorphous + Zeolite X |
| 100 | Zeolite X |
| 240 | Zeolite X |

Up to 48 hours the product was only partly converted to zeolite X. At 100–240 hours the product was substantially pure zeolite X as stated by Kimberlin et al. A repeat of this experiment employing agitation during the heating period gave a mixture of zeolites B and C throughout the heating period which was continued up to 240 hours.

Experiment B - In this experiment the metasilicate was active sodium metasilicate pentahydrate and the reaction mixture was maintained at 210° F in the absence of any agitation.

The product at 3 and 6 hours was substantially pure zeolite X. At 24 hours some of the zeolite X had been converted to zeolite B and at 48 hours further conversion of zeolite B to analcite (a terminal zeolite product) had occurred. At 100 hours total conversion of the product to analcite had occurred and this remained the sole product at 240 hours. On repeating this experiment employing agitation during the heating period the same results were obtained.

These experiments demonstrate that the results obtained by Kimberlin et al are only obtained using an inactive sodium metasilicate pentahydrate.

EXAMPLE 3

To demonstrate the need of having at least part of the siliceous component present in active form in the process of the present invention, experiments were carried out using hydrated sodium metasilicate of activity rating 0,30,100 and 400 units respectively, the oxide molar ratios of the zeolite reaction mixture being:-

$SiO_2/Al_2O_3 = 20.0$
$Na_2O/SiO_2 = 0.4$
$H_2O/Na_2O = 40.0$

These experiments are shown in Table 3. It will be observed that the more active the metasilicate the purer is the product and the shorter is the reaction time.

EXAMPLE 4

This example illustrates the preparation in accordance with the invention of zeolite Y products having $SiO_2/Al_2O_3$ molar ratios of from 3.75 to 6.0 using various types of inactive silicate in association with active hydrated metasilicates and establishes that zeolite Y can be obtained in as little as 2 hours by employing the methods of this invention.

The results of a series of Experiments are shown in Table 4.

EXAMPLE 5

This example shows the ranges of oxide molar ratios within which the invention applies and the results of the experiments carried out are shown in Table 5. In the experiments given in Tables 4 and 5 no ageing step was employed but mechanical agitation to ensure the homogeneity of the reaction mixture and rapidity of reaction was employed.

EXAMPLE 6

This example illustrates the effect of reaction time upon the zeolite product.

Experiment A — Reactants comprising 1420 g of active sodium metasilicate pentahydrate (activity rate = 100 units), 398 g of sodium aluminate (molar composition 1.3 $Na_2O$. $Al_2O_3$. $12H_2O$), 2660g. colloidal silica and 3050 g. water were mixed and stirred and heated for various periods at 90° – 100° C. No ageing of the aluminosilicate gel was used. The oxide molar ratios of the reactants were:-
$SiO_2/Al_2O_3 = 2.0$
$Na_2O/SiO_2 = 0.40$
$H_2O/Na_2O = 40.0$ At the end of 16 hours the product contained zeolite Y with some amorphous material. After 24 hours the product was essentially zeolite Y with a $SiO_2/Al_2O_3$ molar ratio of 5.45. At 30 hours the ratio had fallen to 5.25 and at 40 hours to 5.18. As will be seen, the optimum reaction time for the particular conditions quoted was between 16 and 24 hours.

Experiment B Reactants comprising 398g. of sodium aluminate (molar composition 1.3 $Na_2O$. $Al_2O_3$. $12H_2O$), 1060g. of sodium metasilicate pentahydrate (activity rating = 30 units), 2040g. colloidal silica and 2380g. water were mixed and stirred to give a homogeneous gel. The oxide molar ratios of the reactants were
$SiO_2/Al_2O_3 = 15.72$
$Na_2O/SiO_2 = 0.40$
$H_2O/Na_2O = 40.0$ The reaction mixture was heated to 90° – 100° C and after 12 hours at this temperature the product was zeolite Y with amorphous material. After 24 hours the product was 95% zeolite Y of $SiO_2/Al_2O_3$ molar ratio of 5.0. At 48 hours the product was a mixture of zeolite Y, zeolite B and zeolite C, whilst at 96 hours the product was substantially zeolite B. The optimum reaction time under the conditions employed in this experiment was about 24 hours.

For any other set of conditions, the optimum reaction time can be determined in a similar manner.

Table 2

Zeolite Y preparation. Comparison of active and inactive metasilicates (see Example 1)

| (Expt) | Type (s) silicate used | Activity Rating Units | Reacton Mixture Used | Aged Hrs. | Agitated | Duration at 90–100° C Hours | Product Identification | $SiO_2/Al_2O_3$ |
|---|---|---|---|---|---|---|---|---|
| 1 | Colloidal silica (2) | 0 | $SiO_2/Al_2O_3 = 20$; $Na_2O/SiO_2 = 0.4$; $H_2O/Na_2O = 40.0$ 100.0g. colloidal silica 13.6g. sodium hydroxide 10.86g. sodium aluminate (1.3$Na_2O$ . $Al_2O_3$ 14 $H_2O$) 65.6g. water | 0 | No | 72 | ca.60% zeolite Y + amorphous | 4.5 4.5 |
| 2 | Colloidal silica (2) | 0 | " | 0 | Yes | 12 | zeolite B+ zeolite C+ amorphous | — |
| 3 | " | 0 | " | 24 | No | 72 | 90% zeolite Y | 5.0 |
| 4 | " | 0 | " | 24 | Yes | 12 | zeolite B+ zeolite C+ amorphous | — |
| 5 | Colloidal silica (2) Sodium metasilicate pentahydrate -inactive | 0 0 | 142.0g. sodium metasilicate pentahydrate 266.0g. colloidal silica (2) 39.8g. solution aluminate (1) 305.0g. water | 24 | No | 72 | 90% zeolite Y | 4.9 |
| 6 | " | " | " | 0 | yes | 12 | zeolite B+ zeolite C+ amorphous | — |
| 7 | " | " | " | 24 | Yes | 12 | zeolite B+ zeolite C +amorphous | — |
| 8 | Colloidal silica (2) active sodium metasilicate pentahydrate | 30 | " | 0 | Yes | 36 | ca.90% zeolite Y | 4.6 |
| 9 | Colloidal silica (2) Sodium metasilicate nonahydrate -inactive | 0 0 | 190.3g.sodium metasilicate monahydrate 266.0g. colloidal silica (2) 39.8g.sodium aluminate (1) 256.7g. water | 0 | Yes | 12 | zeolite B+ zeolite C+ amorphous | — |
| 10 | Colloidal silica(2) active sodium meta- | | | | | | | |

Table 2-continued

Zeolite Y preparation. Comparison of active and inactive metasilicates (see Example 1)

| (Expt) | Type (s) silicate used | Activity Rating Units | Reacton Mixture Used | Aged Hrs. | Agitated | Duration at 90–100° C Hours | Product Identification | SiO₂/Al₂O₃ |
|---|---|---|---|---|---|---|---|---|
| | silicate nonahydrate | 30 | " | 0 | Yes | 36 | ca.95% zeolite Y | 4.5 |

Table 3

Activity in Zeolite Y Preparations (see Example 3)

| Expt. No. | Activity Rating of the Metasilicate Units | Composition of reaction mixture $SiO_2/Al_2O_3 = 20.0$, $Na_2O/SiO_2 = 0.4$, $H_2O/Na_2O = 40.0$ | Aged hours | Agitated | Reacted hours | Product Identification | $SiO_2/Al_2O_3$ |
|---|---|---|---|---|---|---|---|
| 11 | 0 | 142.0g. sodium metasilicate pentahydrate 39.8g. sodium aluminate (1) 266.0g. colloidal silica(2) 305.0g. water | 0 | Yes | 12 | Zeolite B + Zeolite C + Amorphous | |
| 12 | 0 | " | 24 | No | 72 | 90% Zeolite Y | 4.9 |
| 13 | 30 | " | 0 | yes | 36 | 90% Zeolite Y | 4.6 |
| 14 | 100 | " | 0 | Yes | 24 | 97% Zeolite Y | 5.1 |
| 15 | 400 | 100.8g hydrated sodium metasilicate (3) 32.2g. sodium aluminate (1) 222.0g. colloidal silica(2) 333.0g. water | 0 | yes | 16 | 100% Zeolite Y | 5.2 |

Table 4

Zeolite Y Preparation (see Example 4)

| Expt. No. | Type(s) silicate used | Activity Rating Used | Reaction Mixture Used Weight | Molar $SiO_2/Al_2O_3$ | Molar $Na_2O/SiO_2$ | Molar $H_2O/Na_2O$ | Duration at 90–100° C hours | Product Identification | $SiO_2/Al_2O_3$ |
|---|---|---|---|---|---|---|---|---|---|
| 16 | Sodium metasilicate pentahydrate colloidal silica (2) | 100 0 | 63.6g. sodium metasilicate pentahydrate 112.0g. colloidal silica 39.8g. sodium aluminate (1) 183.0g. water | 8.6 | 0.5 | 40 | 4.5 | 100% zeolite Y | 3.98 |
| 17 | Hydrated sodium metasilicate (3) waterglass (5) | 400 0 | 180.5g. sodium metasilicate (3) 2360.0g. waterglass (5) 398.0g. sodium aluminate (1) 5250.0g. water | 12 | 0.64 | 50 | 2.0 | 100% zeolite Y | 3.75 |
| 18 | Sodium metasilicate pentahydrate colloidal silica (2) | 100 0 | 84.8g. sodium metasilicate pentahydrate 184.0g. colloidal silica 39.8g. sodium aluminate (1) 195.0g. water | 13.24 | 0.4 | 40 | 24 | 100% zeolite Y | 4.82 |
| 19 | Sodium metasilicate pentahydrate waterglass (4) | 100 0 | 106.0g. sodium metasilicate pentahydrate 3960.0g. waterglass (4) 398.0g. sodium aluminate (1) 1322.0g. water | 15.26 | 0.30 | 45 | 23 | 100% zeolite Y | 5.4 |
| 20 | Sodium metasilicate pentahydrate waterglass (4) | 100 0 | 63.6g. sodium metasilicate pentahydrate 4717.0g. waterglass (4) 398.0g. sodium aluminate (1) 1210.0g. water | 17.9 | 0.34 | 45 | 48 | 95% zeolite Y | 6.0 |
| 21 | Hydrated sodium metasilicate (3) waterglass (4) | 400 0 | 306.0g. hydrated sodium metasilicate (3) 3920.0g. waterglass (4) 8100.0g. water | 20 | 0.6 | 50 | 2.0 | 100% zeolite Y | 4.0 |

Table 5

Zeolite Y Preparations (see Example 5)

| Expt. No. | Type(s) silicate used | Activity Rating | Reaction Mixture Used Weight | Molar $SiO_2/Al_2O_3$ | Molar $Na_2O/SiO_2$ | Molar $H_2O/Na_2O$ | Duration at 90–100° C hours | Product Identification | $SiO_2/Al_2O_3$ |
|---|---|---|---|---|---|---|---|---|---|
| 22 | Active sodium metasilicate ($Na_2O \cdot SiO_2$. | 1,000 | 59.6g. active silicate 112.0g. colloidal silica (2) | 5 | 0.7 | 40 | 4.0 | 100 Zeolite Y | 3.1 |

Table 5-continued

Zeolite Y Preparations (see Example 5)

| Expt. No. | Type(s) silicate used | Activity Rating | Reaction Mixture Used Weight | $SiO_2/Al_2O_3$ | $Na_2O/SiO_2$ | $H_2O/Na_2O$ | Duration at 90–100° C hours | Product Identification | $SiO_2/Al_2O_3$ |
|---|---|---|---|---|---|---|---|---|---|
|  | 0.77 $H_2O$) |  | 79.6g. sodium aluminate (1)<br>248.0g. water |  |  |  |  |  |  |
| 23 | Active silicate as 22 | 1,000 | 31.2g. active silicate<br>234.0g. colloidal silicate (2)<br>79.6g. sodium aluminate (1) | 7 | 0.35 | 55 | 16.0 | 98% Zeolite Y | 5.6 |
|  | Colloidal silica (2) | 0 | 225.0g. water |  |  |  |  |  |  |
| 24 | Active silicate ($Na_2O.SiO_2.2.11\ H_2O$) | 1,000 | 35.2g. sodium metasilicate<br>276.0g. colloidal silicate (2)<br>79.6g. sodium aluminate (1) | 8 | 0.30 | 55 | 42.0 | 95% Zeolite Y | 5.6 |
|  | Colloidal silicate (2) | 0 | 225.0g. water |  |  |  |  |  |  |
| 25 | Active silicate as 22 | 1,000 | 146.0g. active silicate |  |  |  |  | 93% |  |
|  | Colloidal silica (2) | 0 | 104.0g. colloidal silicate (2)<br>120.4g. aluminium sulphate $Al_2(SO_4)_3 14.4. H_2O$<br>356.0g. water | 8 | 0.30 | 55 | 30.0 | Zeolite Y | 5.5 |
| 26 | Active silicate as (22) | 1,000 | 28.8g. active silicate<br>207.5g. colloidal silica (2)<br>49.8g. sodium aluminate (1) | 10 | 0.3 | 55 | 42.0 | 94% Zeolite Y | 5.9 |
|  | Colloidal silica(2) | 0 | 195.0g. water |  |  |  |  |  |  |
| 27 | Active silicate $Na_2O.SiO_2.0.67\ H_2O$ | 1,000 | 112.0g. active silicate<br>332.0g. colloidal silica (2)<br>49.7g. sodium aluminate (1) | 20 | 0.4 | 22 | 16.0 | 97% Zeolite Y | 5.2 |
|  | Colloidal silica (2) | 0 | 120.0g. water |  |  |  |  |  |  |
| 28 | Active silicate as 22 | 1,000 | 30.0g. active silicate<br>88.7g. colloidal silica (2)<br>13.3g. sodium aluminate (1) | 20 | 0.4 | 120 | 112 | 100% Zeolite Y | 5.95 |
|  | Colloidal silica (2) | 0 | 503.0g. water |  |  |  |  |  |  |
| 29 | Active silicate as 22 | 1,000 | 95.3g. active silicate<br>120.0g. colloidal silicate (2)<br>40.1g. aluminium sulphate as 25 | 20 | 0.4 | 45 | 18 | 94% Zeolite Y | 5.3 |
|  | Colloidal silica (2) | 0 | 320.0g. water |  |  |  |  |  |  |
| 30 | Active silicate as 27 | 1,000 | 90.0g. active silicate<br>266.0g. colloidal silica (2)<br>39.8g. sodium aluminate (1) | 30 | .35 | 45 | 64 | 90% Zeolite Y | 6.15 |
|  | Colloidal silica (2) | 0 | 430.0g. water |  |  |  |  |  |  |
| 31 | Active silicate as 22 | 1,000 | 66.7g. active silicate<br>168.7g. colloidal silica (2)<br>13.3g. sodium aluminate (1) | 40 | 0.40 | 40 | 24 | 95% Zeolite Y | 5.8 |
|  | Colloidal silica (2) | 0 | 252.0g. water |  |  |  |  |  |  |
| 32 | Active silicate as 22 | 1,000 | 45.5g. active silicate<br>32.6g. colloidal silica (2)<br>4.0g. sodium aluminate (1) | 50 | 0.7 | 40 | 4 | Zeolite Y+ ca 10% Zeolite C |  |
|  | Colloidal silica (2) | 0 | 222.0g. water |  |  |  |  |  |  |

I claim:

1. A method of preparing zeolite Y of high degree of purity and having a silica to alumina molar ratio of from greater than 3.0 up to about 6.2 which comprises (a) preparing an aqueous aluminosilicate reaction mixture by mixing an active hydrated sodium metasilicate, an alumina component and an $Na_2O$ component or an active hydrated sodium metasilicate, an alumina component, an $Na_2O$ component and other siliceous material, the reaction mixture having a composition expressed in terms of oxide molar ratios within the following ranges:

|  | $Na_2O/SiO_2$ | $SiO_2/Al_2O_3$ | $H_2O/Na_2O$ |
|---|---|---|---|
| (1) | 0.28 – <0.30 | 8 – 10 | 20 – 70 |
| (2) | 0.30 – <0.31 | 8 – 12 | 20 – 70 |
| (3) | 0.31 – <0.32 | 8 – 14 | 20 – 70 |
| (4) | 0.32 – <0.34 | 8 – 16 | 12 – 90 |
| (5) | 0.34 – <0.40 | 7 – 40 | 12 – 120 |
| (6) | 0.4 – <0.7 | 5 – 50 | 12 – 120 |
| (7) | 0.7 – 1.0 | 31 – 50 | 12 – 120 | the ratio of the active hydrated sodium metasilicate to any other siliceous material present in the aluminosilicate reaction mixture expressed on a molar silica basis lying within the range 1.0:0 to 1.0:6,000 and (b) agitating the aluminosilicate reaction mixture while heating the aluminosilicate reaction mixture at a temperature in the range of from 20° C. to 120° C. until a crystalline product is obtained.

2. A method of preparing zeolite Y according to claim 1 wherein the $H_2O/Na_2O$ molar ratios of the oxide molar ratios in the ranges (1) to (7) are 35-60, 35-60, 30-60, 30-70, 20-90, 20-90, and 20-90 respectively.

3. A method of preparing zeolite Y according to claim 1 wherein the $SiO_2/Al_2O_3$ molar ratios in the ranges (5) and (6) are 8-30 and 10-30 respectively.

4. A method of preparing zeolite Y according to claim 1 wherein the alumina component of the aluminosilicate reaction mixture is provided by sodium aluminate.

5. A method of preparing zeolite Y according to claim 1 wherein the alumina component of the aluminosilicate reaction mixture is provided by a soluble aluminum salt.

6. A method of preparing zeolite Y according to claim 1 wherein the other siliceous material employed in preparing the aluminosilicate reaction mixture is silica of colloidal particle size.

7. A method of preparing zeolite Y of high degree of purity and having a silica to alumina molar ratio of from greater than 3.0 up to about 6.2 which comprises (a) preparing an aqueous aluminosilicate reaction mixture by thoroughly mixing an aqueous solution of sodium aluminate, an active hydrated sodium metasilicate and a silica of colloidal particle size, said sodium metasilicate and silica being in proportions expressed on a silica molar basis of from 1.0:0 to 1.0:60.0, the reaction mixture having a composition expressed in terms of oxide mole ratios within the following ranges:

|     | $Na_2O/SiO_2$ | $SiO_2/Al_2O_3$ | $H_2O/Na_2O$ |
|-----|---------------|------------------|---------------|
| (1) | 0.28 – <0.30  | 8 – 10           | 35 – 60       |
| (2) | 0.30 – <0.31  | 8 – 12           | 35 – 60       |
| (3) | 0.31 – <0.32  | 8 – 14           | 30 – 60       |
| (4) | 0.32 – <0.34  | 8 – 16           | 30 – 70       |
| (5) | 0.34 – <0.40  | 8 – 30           | 20 – 90       |
| (6) | 0.4 – <0.7    | 10 – 30          | 20 – 90       |
| (7) | 0.7 – <1.0    | 31 – 50          | 20 – 90       | and (b) heating the prepared aluminosilicate reaction mixture while agitating at a temperature in the range of from 80° – 120° C. until a crystalline product is obtained.

8. A method of preparing zeolite Y according to claim 1 in which the aluminosilicate reaction mixture is prepared by adding a solution of the alumina component to a stirred solution containing the active hydrated sodium metasilicate and any inactive siliceous material.

* * * * *